United States Patent
Du et al.

(10) Patent No.: US 11,283,649 B2
(45) Date of Patent: *Mar. 22, 2022

(54) MULTICAST TRAFFIC ACROSS VIRTUAL NETWORKS (VNS)

(71) Applicant: INTERNATIONAL BUSINESS MACHINES CORPORATION, Armonk, NY (US)

(72) Inventors: Kai Hong Du, Shanghai (CN); Heng Guo Ge, Jiangsu (CN); Shashi Pratap Singh, Ghansoli (IN); Lin Wei Wu, Jiangsu (CN); Le Od Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,926

(22) Filed: Sep. 30, 2019

(65) Prior Publication Data
US 2020/0028715 A1    Jan. 23, 2020

Related U.S. Application Data

(63) Continuation of application No. 15/430,608, filed on Feb. 13, 2017, now Pat. No. 10,904,036.

(51) Int. Cl.
*H04L 12/46* (2006.01)
*H04L 12/18* (2006.01)

(52) U.S. Cl.
CPC ...... *H04L 12/4641* (2013.01); *H04L 12/1886* (2013.01); *H04L 12/4633* (2013.01)

(58) Field of Classification Search
CPC ............. H04L 12/4641; H04L 12/4633; H04L 12/1886

(Continued)

(56) References Cited

U.S. PATENT DOCUMENTS 8,898,320 B2    11/2014    Mai et al.
9,374,270 B2    6/2016    Nakil et al.
(Continued)

OTHER PUBLICATIONS

L. Yong, et al. "Network Virtualization Edge (NVE)," Internet Engineering Task Force, http://www.ietf.org/shadow.tml, Feb. 13, 2014.

(Continued)

*Primary Examiner* — Kibrom T Hailu
*Assistant Examiner* — Nizam U Ahmed
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: receiving, by a Network Virtualization Edge (NVE) of a first virtual network (VN), a multicast packet from a virtual machine (VM) of the first virtual network (VN); determining, by the NVE, whether the NVE currently supports forwarding the multicast packet to a second NVE of a second virtual network (VN), the second virtual network (VN) being logically separated from the first virtual network (VN); responsively to determining that the NVE currently supports forwarding the multicast packet to a second NVE of a second virtual network (VN) forwarding, by the NVE, the multicast packet to the second NVE.

20 Claims, 6 Drawing Sheets

(58) Field of Classification Search
USPC .......................................................... 370/390
See application file for complete search history.

(56) References Cited

U.S. PATENT DOCUMENTS

| | | | |
|---|---|---|---|
| 9,698,995 | B2 | 7/2017 | Ghanwani et al. |
| 10,154,073 | B2 | 12/2018 | Uchida |
| 2010/0246579 | A1* | 9/2010 | Overtoom ............ H04N 21/643 370/390 |
| 2013/0322443 | A1 | 12/2013 | Dunbar |
| 2014/0098815 | A1* | 4/2014 | Mishra .................. H04L 45/021 370/390 |
| 2015/0063194 | A1 | 3/2015 | Yang |
| 2015/0195178 | A1* | 7/2015 | Bhattacharya ........ H04L 45/745 718/1 |
| 2016/0285736 | A1 | 9/2016 | Gu |
| 2016/0330166 | A1* | 11/2016 | Xu ......................... H04L 61/103 |
| 2016/0337423 | A1* | 11/2016 | Uchida ................... H04L 45/74 |
| 2017/0331746 | A1* | 11/2017 | Qiang ..................... H04L 47/15 |
| 2018/0131619 | A1* | 5/2018 | Hao ....................... H04L 47/125 |
| 2018/0139123 | A1 | 5/2018 | Qiang |
| 2018/0234259 | A1 | 8/2018 | Du et al. |

OTHER PUBLICATIONS

M. Lasserre, et al. "Framework for Data Center (DC) Network Virtualization," Internet Engineering Task Force, http://www.ietf.org, Oct. 2014.

T. Narten, et al. "Problem Statement: Overlays for Network Virtualization." Internet Engineering Task Force, http://www.ietf.org, Oct. 2014.

N. Shaheen Mariam, et al., "Implementation of Overlay Routing Based Multicasting Using SSDN Controller in Cloud," International Journal of Emerging Technology in Computer Science & Electronics, ISSN: 0976-1353, vol. 21, Issue 4, Apr. 2016.

K. Matsuo, et al., "TE-Cast: Supporting General Broadcast/Multicast Communications in Virtual Netowrks." IEEE/ACM 8th International Conference on Utility and Cloud Computing, 2015.

S. Nadas, et al. "Virtual Router Redundancy Protocol (VRRP) Version 3 for IPv4 and IPv6." Internet Engineering Task Force, http://www.ietf.org, Mar. 2010.

P. Mell, et al. "The NIST Definition of Cloud Computing", NIST Special Publication 800-145, Sep. 2011, Gaithersburg, MD.

Non-Final Office Action, U.S. Appl. No. 15/430,608, filed Feb. 13. 2017, dated Jun. 29, 2018.

Applicant's Response to Non-Final Office Action, U.S. Appl. No. 15/430,608, filed Feb. 13, 2017, 2017, dated Sep. 29, 2018.

Final Office Action, U.S. Appl. No. 15/430,608, filed Feb. 13, 2017, dated Feb. 5, 2019.

Applicant's Response to Final Office Action, U.S. Appl. No. 15/430,608, filed Feb. 13, 2017, dated Apr. 5, 2019.

Non-Final Office Action, U.S. Appl. No. 15/430,608, filed Feb. 13. 2017, dated May 17, 2019.

Applicant's Response to Non-Final Office Action, U.S. Appl. No. 15/430,608, filed Feb. 13, 2017, 2017, dated May 23, 2019.

Notice of Allowance, U.S. Appl. No. 15/430,608, filed Feb. 13, 2017, dated Jun. 25, 2019.

List of IBM Patents or Applications Treated as Related, Oct. 3, 2019, 2 pgs.

Non-Final Office action, U.S. Appl. No. 15/430,608, filed Feb. 13. 2017, dated Nov. 21, 2019.

Applicant's Response to Non-Final Office Action for U.S. Appl. No. 15/430,608, filed Feb. 13, 2017, dated Dec. 31, 2019.

Non-Final Office action, U.S. Appl. No. 15/430,608, filed Feb. 13. 2017, dated Jun. 17, 2020.

Communication to Record Substance of Interview, U.S. Appl. No. 15/430,608, filed Feb. 13, 2017, dated Aug. 27, 2020.

* cited by examiner

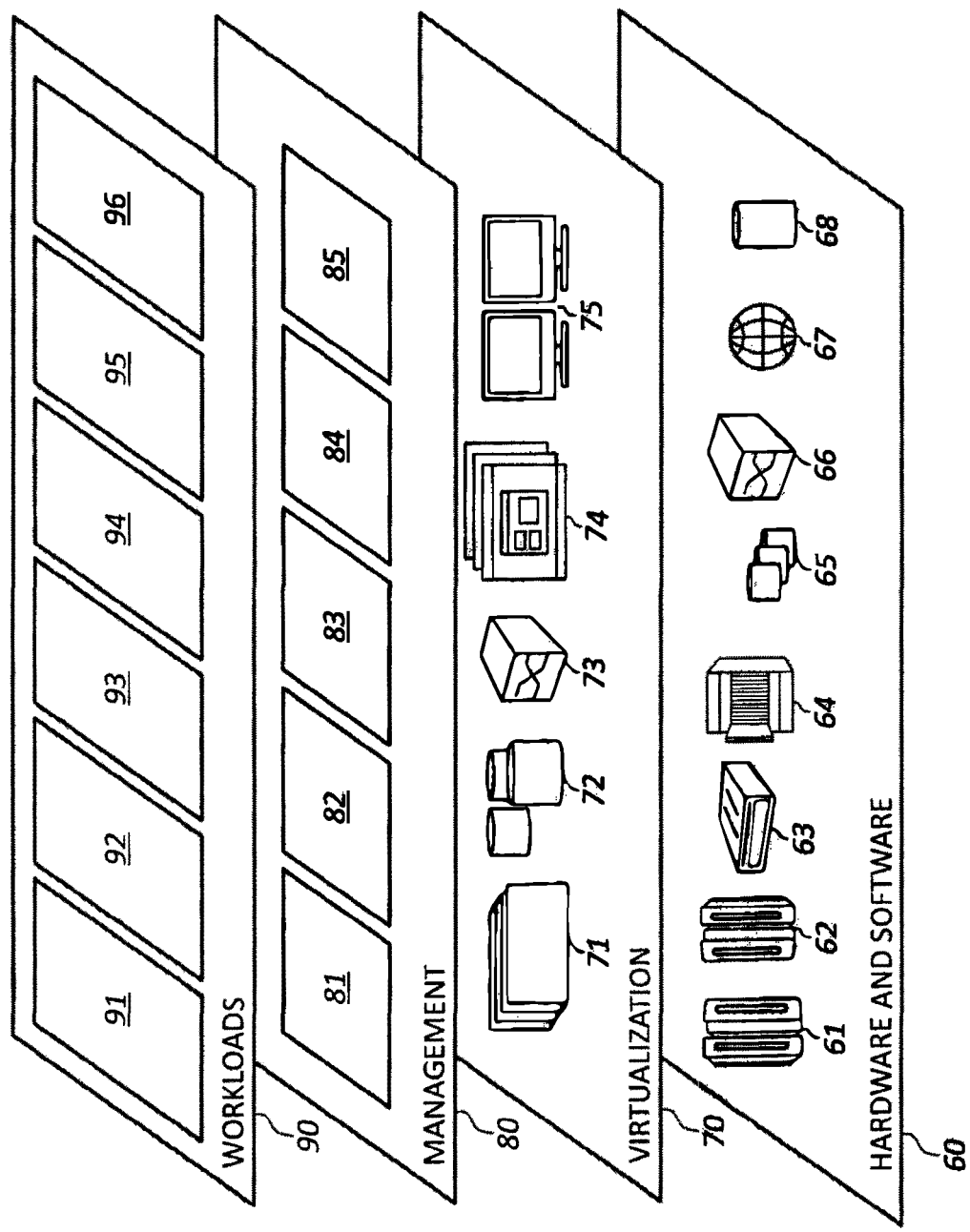

MULTICAST TRAFFIC ACROSS VIRTUAL NETWORKS (VNS)

CROSS-REFERENCE TO RELATED APPLICATION

This application is a continuation of U.S. application Ser. No. 15/430,608, filed Feb. 13, 2017, titled "MULTICAST TRAFFIC ACROSS VIRTUAL NETWORKS (VNs)", which is incorporated by reference herein in its entirety.

TECHNICAL FIELD

The present disclosure relates to computer networks in general and specifically to virtual networks.

BACKGROUND

Data centers are increasingly being consolidated in an effort to improve the deployment time of applications and reduce operational costs. This coincides with an increasing demand for computer, storage, and network resources from applications. In order to scale compute, storage, and network resources, physical resources are being abstracted from their logical representation, in what is referred to as server, storage, and network virtualization. Virtualization can be implemented in various layers of computer systems or networks.

The demand for server virtualization is increasing in data centers. With server virtualization, each physical server supports multiple virtual machines (VMs), each running its own operating system, middleware, and applications. Virtualization is a key enabler of workload agility, i.e., allowing any server to host any application and providing the flexibility of adding, shrinking, or moving services within the physical infrastructure. Server virtualization provides numerous benefits, including higher utilization, increased security, reduced user downtime, reduced power usage, etc.

Multi-tenant data centers are taking advantage of the benefits of server virtualization to provide a new kind of hosting, a virtual hosted data center. Multi-tenant data centers are ones where individual tenants could belong to a different company (in the case of a public provider) or a different department (in the case of an internal company data center). Each tenant has the expectation of a level of security and privacy separating their resources from those of other tenants. For example, one tenant's traffic must never be exposed to another tenant, except through carefully controlled interfaces, such as a security gateway (e.g., a firewall).

SUMMARY

Shortcomings of the prior art are overcome, and additional advantages are provided, through the provision, in one aspect, of a method. The method can include, for example: receiving, by a Network Virtualization Edge (NVE) of a first virtual network, a multicast packet from a virtual machine (VM) of the first virtual network; determining, by the NVE, whether the NVE currently supports forwarding the multicast packet to a second NVE of a second virtual network, the second virtual network being logically separated from the first virtual network; responsively to determining that the NVE currently supports forwarding the multicast packet to a second NVE of a second virtual network forwarding, by the NVE, the multicast packet to the second NVE.

In another aspect, a computer program product can be provided. The computer program product can include a computer readable storage medium readable by one or more processing unit and storing instructions for execution by one or more processor for performing a method. The method can include, for example: receiving, by a Network Virtualization Edge (NVE) of a first virtual network, a multicast packet from a virtual machine (VM) of the first virtual network; determining, by the NVE, whether the NVE currently supports forwarding the multicast packet to a second NVE of a second virtual network, the second virtual network being logically separated from the first virtual network; responsively to determining that the NVE currently supports forwarding the multicast packet to a second NVE of a second virtual network forwarding, by the NVE, the multicast packet to the second NVE.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a Network Virtualization Edge (NVE) of a first virtual network, a multicast packet from a virtual machine (VM) of the first virtual network; determining, by the NVE, whether the NVE currently supports forwarding the multicast packet to a second NVE of a second virtual network, the second virtual network being logically separated from the first virtual network; responsively to determining that the NVE currently supports forwarding the multicast packet to a second NVE of a second virtual network forwarding, by the NVE, the multicast packet to the second NVE.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts abstraction model layers according to one embodiment.

DETAILED DESCRIPTION

Figure 1:
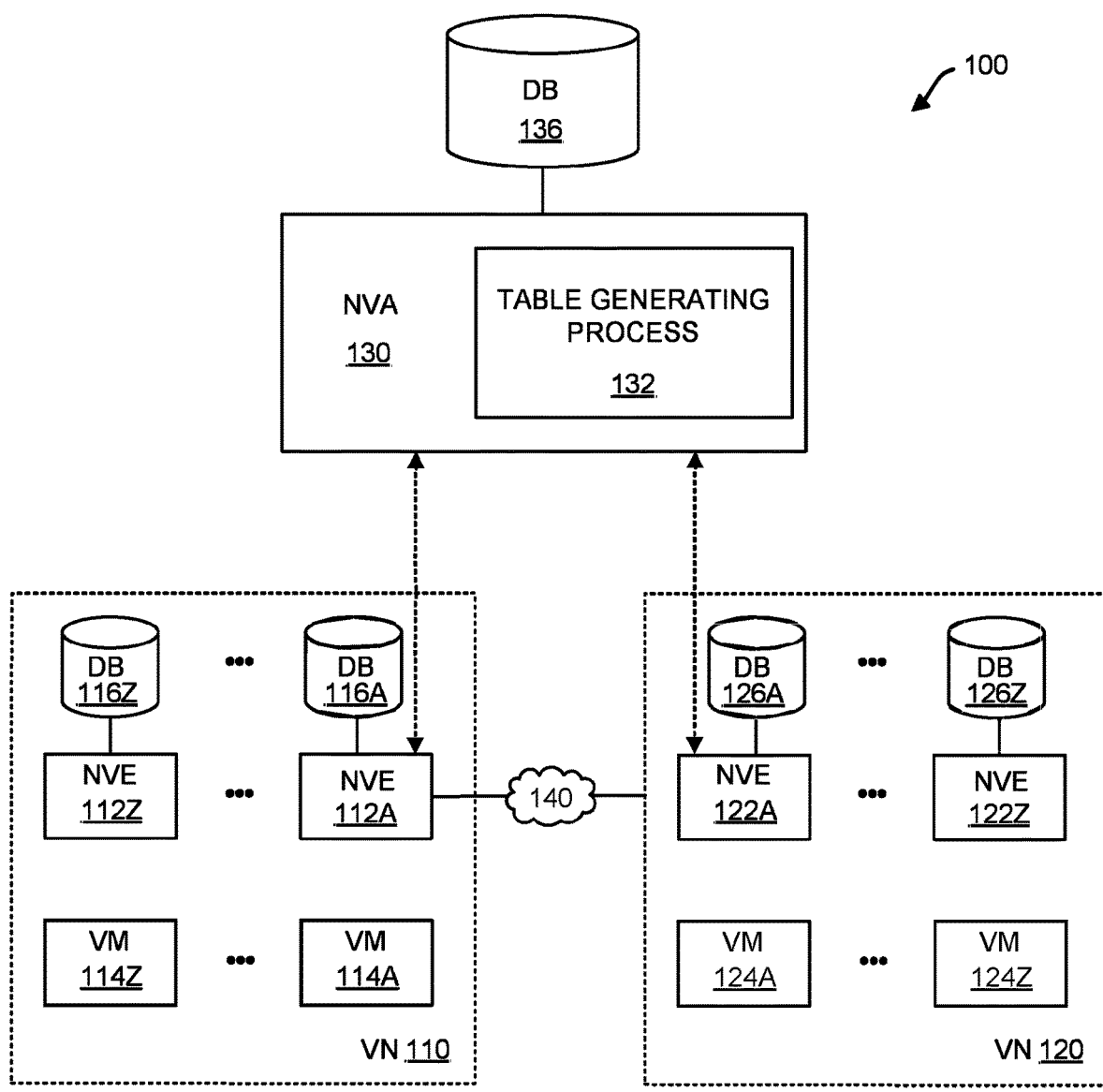
FIG. 1 depicts a system having first and second virtual networks.

An overview of a system 100 is shown in FIG. 1. System 100 can include a first virtual network 110 and second virtual network 120 logically separated from first virtual network 110. First virtual network 110 can include one or more Network Virtualization Edge (NVE) 112A-112Z and one or more virtual machine (VM)114A-114Z. Second virtual network 120 can include one or more Network Virtualization Edge (NVE) 122A-122Z and one or more virtual machine (VM) 124A-124Z. System 100 can also include a Network Virtualization Authority (NVA) 130. In one embodiment, virtual network 110 and virtual network 120 can be virtual networks of a common data center (DC). Each NVE 112A-112Z of virtual network 110 can be associated to one or more VM 114A-114Z of virtual network 110 and each VM 114A-114Z of virtual network 110 can be associated to one or more NVE 112A-112Z of virtual network 110. Each NVE 122A-122Z of virtual network 120 can be associated to one or more VM 124A-124Z of virtual network 120 and each VM 124A-124Z of virtual network 120 can be associated to one or more NVE 122A-122Z of virtual network 120. In an example for purposes of illustration VM 114A can be associated to NVE 112A, VM 114Z can be associated to NVE 112Z, VM 124A can be associated to NVE 122A, and VM 124Z can be associated to NVE 122Z. In another aspect each NVE 112A-112Z, 122A-122Z can have an associated forwarding table database 116A-116Z, 126A-126Z, and NVA 130 can have an associated forwarding table database 136. In another aspect as set forth herein, NVA 130 can run a forwarding table generating process 132. In one embodiment, first virtual network 110 can be a virtual network of a first tenant and the second virtual network 120 can be virtual network of a second tenant. NVEs of different virtual networks of system 100 e.g. NVE 112A and 122A can be in communication with one another via underlay network 140 which can be provided by an IP network.

In one embodiment, each virtual network 110, 112 can be an overlay virtual network, e.g. a Network Virtualization Over Layer 3 (NVO3) overlay virtual network. As set forth herein an NVO3 network can be an overlay network that provides a Layer 2 (L2) and/or Layer 3 (L3) service to Tenant Systems over an L3 underlay network using architecture and protocols as defined by the NVO3 Working Group. Virtual networks 110, 120 can logically overlay an underlay network. An underlay network herein can be a network that provides the connectivity among NVEs and that NVO3 packets are tunneled over, where an NVO3 packet carries an NVO3 overlay header followed by a tenant packet. The underlay network e.g. underlay network 140 as shown in FIG. 1 does not need to be aware that it is carrying NVO3 packets. Addresses on the underlay network appear as "outer addresses" in encapsulated NVO3 packets. In general, the underlay network can use a completely different protocol (and address family) from that of the overlay. In the case of NVO3, the underlay network can be an IP network.

An NVE herein, e.g. NVE 112A-112Z, 122A-122Z can be a network entity that resides at the edge of an underlay network and implements L2 and/or L3 network virtualization functions. The network-facing side of an NVE can use an underlying L3 network to tunnel tenant frames to and from other NVEs. A tenant-facing side of the NVE can sends and receive Ethernet and other data frames to and from individual Tenant Systems e.g. as may be provided by one or more virtual machine (VM). An NVE can be implemented e.g. as part of a virtual switch within a hypervisor, a physical switch or router, or a Network Service Appliance, or it could be split across multiple devices. An NVE 112A-112Z, 122A-122Z which can be implemented as a virtual or physical device can be regarded as an NVE device.

According to NVE data plane functionality, an NVE 112, 122 can perform packet forwarding. An NVE can receive a packet from a tenant system (e.g. as may be provided by a virtual machine) via a virtual access point (VAP), processes it, and forward it to the peer NVE of a common virtual network via an overlay tunnel or forwards to a local VAP. An NVE can receive a packet from a peer NVE, processes it, and forward it to a tenant system via a VAP. In the process, an NVE may modify the packet header and/or insert/remove the tunnel header on the packet prior to the forwarding.

In one embodiment an original packet can be encapsulated by a first-hop network device, e.g. NVE 112A of virtual network 110 and tunneled to a remote NVE 112Z of virtual network 110. The encapsulation can identify the destination of the device that will perform the de-capsulation (i.e., the egress NVE for the tunneled packet) before delivering the original packet to the endpoint. The rest of the network forwards the packet based on the encapsulation header and can be oblivious to the payload that is carried inside.

The following sets forth a "map and encap" process that characterizes a packet transmission between first and second NVEs of a common virtual network, e.g. NVE 112A and 112Z of virtual network 110. NVE 112A can implement a mapping operation that determines where the encapsulated packet should be sent to reach its intended destination VM. Specifically, the mapping function maps the destination address (either L2 or L3) of a packet received from a VM 114A into the corresponding destination address of egress NVE device 112Z. The destination address will be the underlay address of the NVE 112Z performing the de-capsulation and is an IP address. Once the mapping has been determined, the ingress overlay NVE 112A encapsulates the received packet within an overlay header. The final step is to actually forward the (now encapsulated) packet to its destination. The packet is forwarded by the underlay (i.e., the IP network) based entirely on its outer address. Upon receipt at the destination, the egress overlay NVE 112Z de-capsulates the original packet and delivers it to the intended recipient VM 114Z.

In one embodiment NVA 130 can be responsible for distributing and maintaining the mapping information for the entire system 100 which can be an overlay system having a plurality of overlay virtual networks. NVA 130 can provide high performance, high resiliency, failover, etc., and could be implemented in a variety of different ways. For example, one model uses a traditional, centralized "directory-based" database, using replicated instances for reliability and failover. A second model involves using and possibly extending an existing routing protocol (e.g., BGP, IS-IS, etc.). To support different architectural models, it can be useful to have one standard protocol for the NVE-NVA interaction while allowing different protocols and architectural approaches for the NVA itself.

In one embodiment system 100 can be configured to support multicast communications between first virtual network 110 and second virtual network 120. In one embodiment, NVA 130 can include a table generating process 132 for generating forwarding tables. In one embodiment NVE 112A-112Z of first virtual network 110 and NVE 122A-122Z of second virtual network 120 can store in associated forwarding table databases 116A-116Z and 126A-126Z forwarding tables for support of multicast traffic.

A method 200 for support of multicast communication between virtual networks is illustrated with reference to the flow diagram of FIG. 2. Method 200 can include at block 210 receiving, by a Network Virtualization Edge (NVE) e.g. NVE 112A of a first virtual network 110, a multicast packet from a virtual machine (VM) of the first virtual network 110; determining, by the NVE at block 220 whether the NVE currently supports forwarding the multicast packet to a second NVE e.g. NVE 122A of a second virtual network e.g.

network 120, the second virtual network being logically separated from the first virtual network; and at block 230 responsively to determining that the NVE currently supports forwarding the multicast packet to a second NVE of a second virtual network forwarding, by the NVE, the multicast packet to the second NVE. Method 200 can further include at block 240 responsively to determining that the NVE currently does not support forwarding the multicast packet to a second NVE of a second virtual network sending, by the NVE, a registration request to a network virtualization authority (NVA) for registering the NVE to support sending of multicast packets; and receiving at block 250, by the NVE, in response to the registration request a forwarding table supporting multicast packet communication between the first virtual network and the second virtual network.

Figure 3:
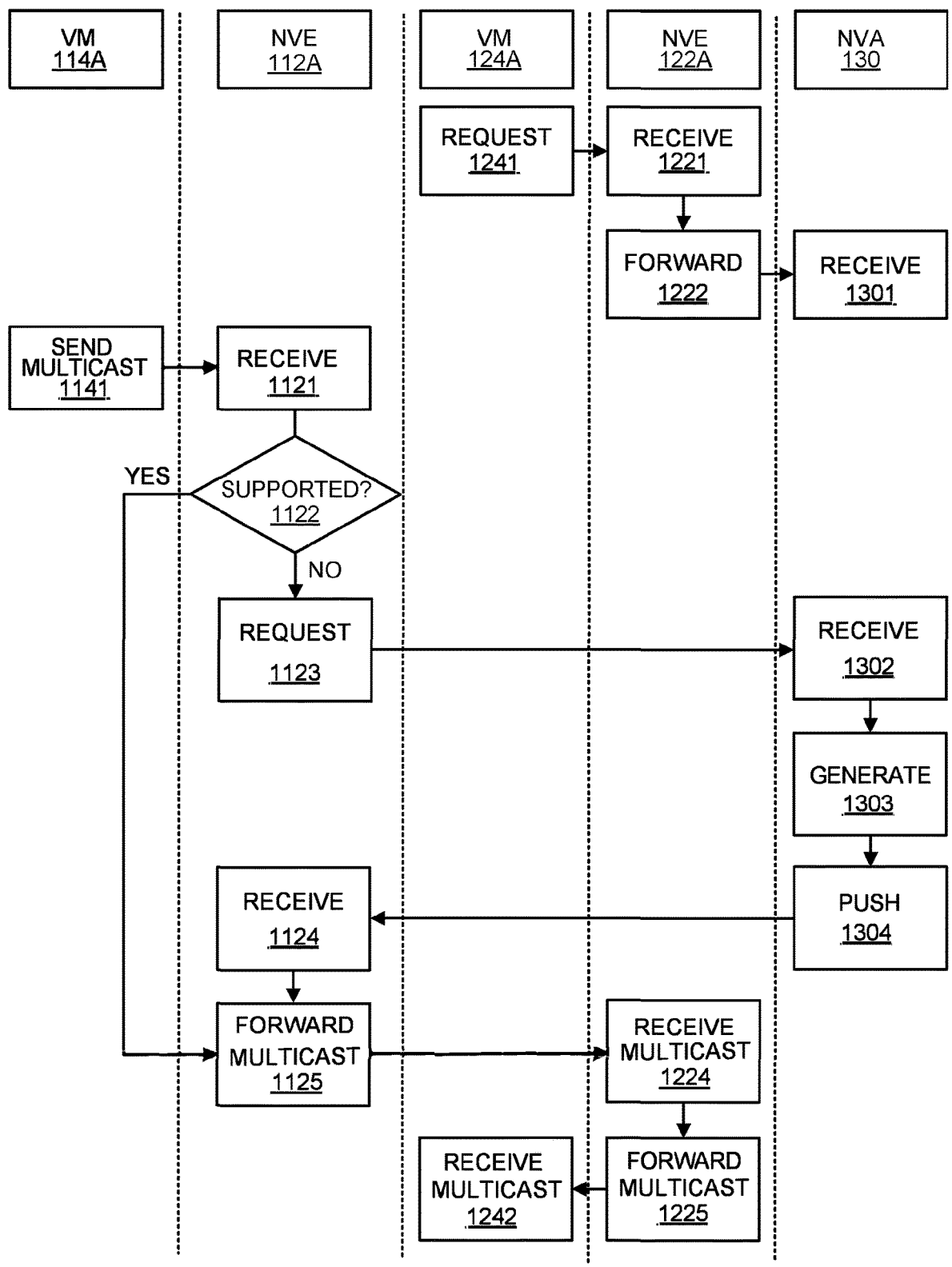
FIG. 3 is a flowchart depicting a method for use in forwarding multicast traffic between virtual networks.

A flowchart illustrating in one embodiment operation system 100 having a VNE and VM of a first virtual network and a VNE and a VM of a second virtual network is set forth in FIG. 3. In the flowchart of FIG. 3, exemplary operations of VNE 112A and VM 114A of first virtual network 110 and NVE 122A and VM 124A of second virtual network 120 are discussed.

The flowchart of FIG. 3 illustrates the case where at a time that VM 114A of first virtual network 110 sends a multicast communication, second virtual network 120 has been configured to support multicast communication from the first virtual network 110 to the second virtual network 120.

At block 1241 VM 124A of second virtual network 120 can initiate a request to join a multicast group. At block 1221 VM 124A can send a request to join a multicast group. System 100 can be configured so that such a request can be received by and trapped by NVE122A of second virtual network 120 to which VM 124A is associated. At block 1221 NVE 122A can receive a request to join a multicast group and at block 1222. Responsively to receiving the request to join a multicast group from VM 124A NVE 122A at block 1221 can (a) generate a multicast receiver table on NVE 122A for storage on database 126A and can (b) forward the multicast group join request to NVA 130. NVA 130 at block 1301 can receive the forwarded at block 1222 and can responsively generate a multicast receiver table on NVA 130 for storage on table database 136 associated to NVA 130.

An example of a multicast receiver forwarding table of NVE 122A generated by NVE 122A and stored on database 126A. NVE 122A at block 1221 is illustrated as follows.

TABLE A

| Multicast Receiver Forwarding Table On NVE | | |
|---|---|---|
| Destination VNID | Multicast Group | Receiver |
| VN2 | Group IP Address | VM2 |

The multicast receiver table of Table A can specify a destination virtual network identifier (VNID), a Group IP address, and receiver identifier that identifies the virtual machine (VM2=VM124A) requesting to join the multicast group.

An example of a generated multicast receiver forwarding table of an NVA generated at block 1301 by NVA 130 and stored on database 136 of NVA 130 is illustrated as follows.

TABLE B

| Multicast receiver forwarding table on NVA | | |
|---|---|---|
| Destination VNID | Multicast Group | Tunnel IP |
| VN2 | Group IP Address | TEP2 |

The multicast receiver forwarding table of Table B (table on NVA 130) can specify a destination virtual network identifier (VNID), a multicast Group IP address, and a tunnel IP address. The tunnel IP address provided by a tunnel endpoint (TEP) IP address can specify the NVE associated to the VM registering for receipt of group multicast packets (in the described example NVE 122A associated to VM 124A).

At block 1141 VM 114A of first virtual network 110 can send a multicast packet having a multicast group destination Group IP address. System 100 can be configured so that such a multicast packet can be received by and trapped by NVE 112A of first virtual network 110 associated to VM 114A in the described example of the flowchart of FIG. 3. At block 1121 NVE 112A responsively to receipt of the multicast packet can perform examining forwarding table database 116A of NVE 112A to determine if database 116A includes a forwarding table supporting external virtual network forwarding of the multicast packet. The examining at block 1121 can include examining database 116A to determine whether database 116A includes one or more forwarding table specifying the Group IP address of the multicast packet transmitted at block 1141. Responsively to a determination that the multicast communication is not supported NVE 112A at block 1123 can send a request to register NVE 112A as a multicast group sender to NVA 130. Responsively to a determination that the multicast communication is supported NVE 112A can proceed to block 1125 to forward the multicast communication to NVE 122A in accordance with the forwarding information of database 116A.

Regarding processing in the case the current multicast communication is not supported, NVA 130 at block 1302 can responsively receive the request from NVE 112A to register NVE 112A as a multicast group sender and at block 1303 can generate a forwarding table based on forwarding data specified in the request received at block 1302.

Table C sets forth table forwarding data that can be sent in a request from NVE 112A to NVA 130 to register NVA 112A as a multicast group sender.

TABLE C

| Table forwarding data of a registration request to register NVE as a multicast group sender | | |
|---|---|---|
| Source VNID | Multicast Group | Tunnel IP |
| VN1 | Group IP Address | TEP1 |

Regarding Table C, Table C can specify the virtual network identifier for the sending virtual network, the multicast group IP address, and a tunnel IP address provided by a TEP IP address specifying the IP address of the source NVE (NVE 112A in the example shown). An exemplary forwarding table that can be generated by NVA 130 at block 1303 is set forth in Table D.

TABLE D

| | | | Dst Tunnel | |
|---|---|---|---|---|
| Src VNID | MGroup IP | Src Tunnel IP | IP | Dst VNIDs |
| VN1 | 226.1.1.1 | TEP1 | TEP2 | VN2 |

In one embodiment, NVA 130 can be configured to generate the forwarding table illustrated in Table D using a process that includes looking up multicast receiver tables having the Group IP addresses specified in a request to register received at block 1302. A generated forwarding table generated by NVA 130 as set forth in Table D can include a multicast Group IP address associated to a source virtual network ID, a destination virtual network ID, a source tunnel IP address provided by a TEP IP address specifying the IP address of the source NVE (the IP address of NVE 112A in the example illustrated), and a destination tunnel IP address provided by a TEP IP address specifying the IP address of the destination NVE (the IP address of NVE 122A in the example illustrated). In the case multiple receiving NVEs have been registered as receiving NVEs for packets designated the multicast Group IP address the forwarding table as shown in Table D can include multiple destination tunnel IP addresses for the multiple NVEs. The multiple NVEs can be NVEs of the second virtual network 120 different from the first virtual network 110. In one embodiment, the multiple NVEs can be NVEs of second to Nth virtual networks 120 different from the first virtual network 110. An exemplary updated forwarded table updated by NVA 130 to specify an additional NVE virtual network is set forth in Table E.

TABLE E

| | | | Dst Tunnel | |
|---|---|---|---|---|
| Src VNID | MGroup IP | Src Tunnel IP | IP | Dst VNIDs |
| VN1 | 226.1.1.1 | TEP1 | TEP2, TEP3 | VN2, VN3 |

In Table E, TEP3 refers to a tunnel IP address provided by a TEP IP address specifying an IP address of an NVE of a third virtual network registered as a receiving NVE, and VN3 provides an additional destination virtual network ID.

At block 1304 NVA 130 can send a generated forwarding table (example shown in Table D) generated at block 1303 to NVE 112A. NVE 112A can responsively store the forwarding table to forwarding table database 116A of NVE 112A and can responsively proceed to block 1125 to forward the multicast packet transmitted by VM 114A at block 1141 in accordance with the newly stored forwarding table of database 136.

Referring to the forwarding table of Table D and the local NVE table to Table A (of receiving NVE 122A) it is seen that system 100 can have all of the information needed for forwarding the multicast packet transmitted from VM 114A of virtual network 110 at block 1141 to receiving VM 124A of second virtual network 120. At block 1125, based in the forwarding information of Table D, NVE 112A which has trapped the multicast packet sent by VM 114A at block 1141 can forward the packet to NVE 122A using the IP address for NVE 122A specified in the table of Table D and being associated to the Group IP address of the sent multicast packet sent at block 1141. At block 1224 NVE 122A of second virtual network 120 can receive the multicast communication and at block 1225 NVE 122A can forward the multicast packet to VM 124A of second virtual network 120 in accordance with forwarding information of the forwarding table as shown in Table A stored in database 126A of NVE 122A. The forwarding table of Table A includes an address of VM 124A of second virtual network 120 associated to the Group IP address of transmitted multicast packet sent by VM 114A of first virtual network at block 1141. In one embodiment, system 100 can be configured so that each of blocks 1141 (by VM 112A); blocks 1121-1123 (by NVE 112A); blocks 1302-1304 (by NVA 130); blocks 1124-1125 (by NVE 112A); 1224-1225 (by NVE 122A); and blocks 1242 (by VM 124A) can be performed automatically and responsively to a preceding block so that a multicast packet sent from a first VM at a first virtual network can be automatically received at a destination VM of a second virtual network even where a sending NVE of a first virtual network is not registered as a multicast sender at a time of sending by the first VM.

Figure 2:
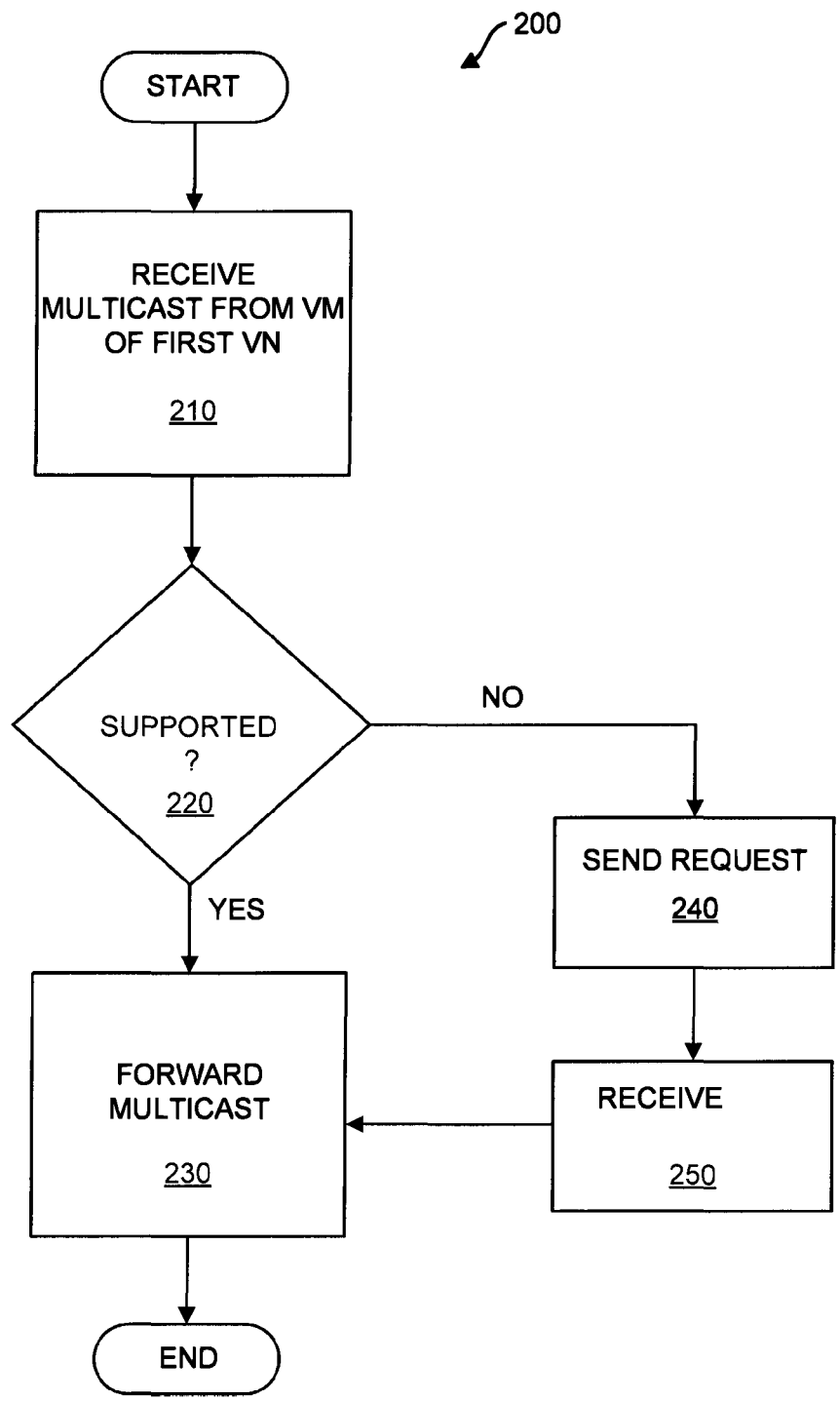
FIG. 2 depicts a flowchart illustrating method for use in forwarding multicast traffic between virtual networks.

In the methods of the flowchart of FIGS. 2 and 3 multicast packets between logically separated first and second virtual networks can be forwarded through respective NVEs of the first and second virtual networks. In another embodiment, system 100 can be configured to include an L3 gateway external to NVEs of first and second virtual network 110 and 120 and multicast traffic can be forwarded through such a defined L3 gateway. In one example, such an L3 gateway can be implemented in a tenant system e.g. a VM associated to a NVE of a virtual network. Embodiments herein recognize that excessive network traffic over a single device or cluster of devices i.e. bottlenecking can occur with implementation of an L3 gateway approach, particularly where several VMs of a virtual network are required to be sending or receiving multicast packets simultaneously.

The flowchart of FIG. 3 illustrates the use case where NVE 112A requests to register as a multicast sender responsively to a determination that NVE 112A does not currently support forwarding of a multicast packet having the certain specified Group IP address of the multicast packet transmitted at block 1141. In another embodiment NVE 112A can pre-register multicast senders prior to a multicast packet being sent by VM 114A at block 1141. For example, prior to block 1141 VM 114A can send a request to register as a multicast sending VM. System 100 can be configured so that NVE 112A associated to VM 114A traps such a request and responsively and automatically to the request being trapped sends a request to NVA 130 to register NVE 112A as a multicast sender NVE in the manner as set forth in connection with block 1124. NVA 130 can then responsively and automatically thereto generate in the manner set forth in reference to block 1303 a forwarding table having generally the form of Table D and associating registered receiving NVEs that have registered to receive multicast packets of the specified multicast Group IP address. NVA 130 responsively to the generating can automatically push the generated forwarding table to NVE 112A.

As described in reference to blocks 1303 and 1304 NVA 130 can generate forwarding tables having sending and receiving NVEs associate to common multicast Group IP addresses and can push such forwarding tables to NVE 112A. As described in connection with blocks 1303 and 1304 such generating and pushing can be performed in response to a received request to register an NVE as a multicast sender. In another aspect system 100 can be configured so that on a periodic basis NVA 130 automatically generates forwarding table provided by an updated forwarding table and automatically pushes the generated forwarding table provided by an updated forwarding table to one or more NVE. The generated and pushed forwarding table can have the form generally shown by Table D and can associate a registered multicast sender NVE to multicast receiver NVEs having common multicast Group IP addresses. The generating and pushing can be performed independent of received requests to register any NVE as a multicast sender, and independent of received requests to register any NVE at a multicast receiver. Referring to the example of the flow diagram of FIG. 3 embodiments herein recognize that prior to multicast packet sending block 1121 and subsequent to a pre-registration of NVE 112A as a multicast sender NVE, additional NVEs may register to NVA 130 as receiver NVEs (in addition to NVE 122A registered at block 1301). For example, NVE 122Z of virtual network 120 may subsequently register as a multicast receiver NVE after block 1301 and before block 1141. Additional NVEs of third fourth and up to Mth virtual networks logically separated from virtually network 110 and virtual network 120 can also register to NVA 130 as registered receiver NVEs.

Embodiments herein recognize that performing generating at block 1303 and pushing at block 1304 automatically and on a periodic basis independent of registration requests can assure that multicast packets are sent to additional NVEs registered to receive such multicast packets. In the performing of generating block 1303 NVA 130 can associate to a certain Group IP address an NVE (which can be a certain NVE output of a plurality of NVEs across different virtual networks) registered to send a multicast packet having the certain Group IP address and all NVEs (which can be a plurality of NVEs across virtual networks) registered to receive a multicast packet having the certain Group IP address. In the performing of the push of the generated forwarding table at block 1304 NVA130 can push the generated forwarding table to the sending NVE (which can be a certain NVE output of a plurality of NVEs across different virtual networks) specified in the generated table and to all receiving NVEs (which can be a plurality of NVEs across different virtual networks) specified in the generated table. The generating and pushing at block 1303 and 1304 can be performed periodically and automatically for each of several Group IP addresses.

Certain embodiments herein may offer various technical computing advantages, involving computing advantages to address problems arising in the realm of computer networks such as network traffic bottlenecking and associated problems of network performance and reliability. Implementation of the approach of the flowcharts of FIGS. 2 and 3 can result in improved system performance and technical computing advantages. Embodiments herein recognize that virtual networks such as virtual networks 110 and 120 often have several NVEs such as NVEs 112A-112Z of virtual network 110 and NVEs 122A-122Z of virtual network 120. Further, embodiments herein recognize that tenant systems such as VMs of a virtual network are often associated to a limited number of NVEs (often on a one to one association basis). Embodiments herein recognize that enforcement of a policy wherein multicast packets can be forwarded through NVEs of virtual networks can result in a spreading of traffic throughout a plurality of nodes of a system 100. Embodiments herein recognize that enforcement of a policy wherein multicast packets can be forwarded through NVEs of virtual networks can accordingly help avoid bottlenecking. Because enforcement of such policy can be implemented in a straightforward matter bottlenecking avoidance can be accomplished with reduced overhead (e.g. can alleviate a need for traffic monitoring and dynamic routing). Implementation of embodiments herein can result in the avoidance of East-West multicast trafficking between virtual networks over an L3 gateway and this can avoid inhibiting performance associated with such traffic. Confining multicast traffic so that multicast traffic flows only internally between security protected virtual networks provides data security advantages.

Figure 4:
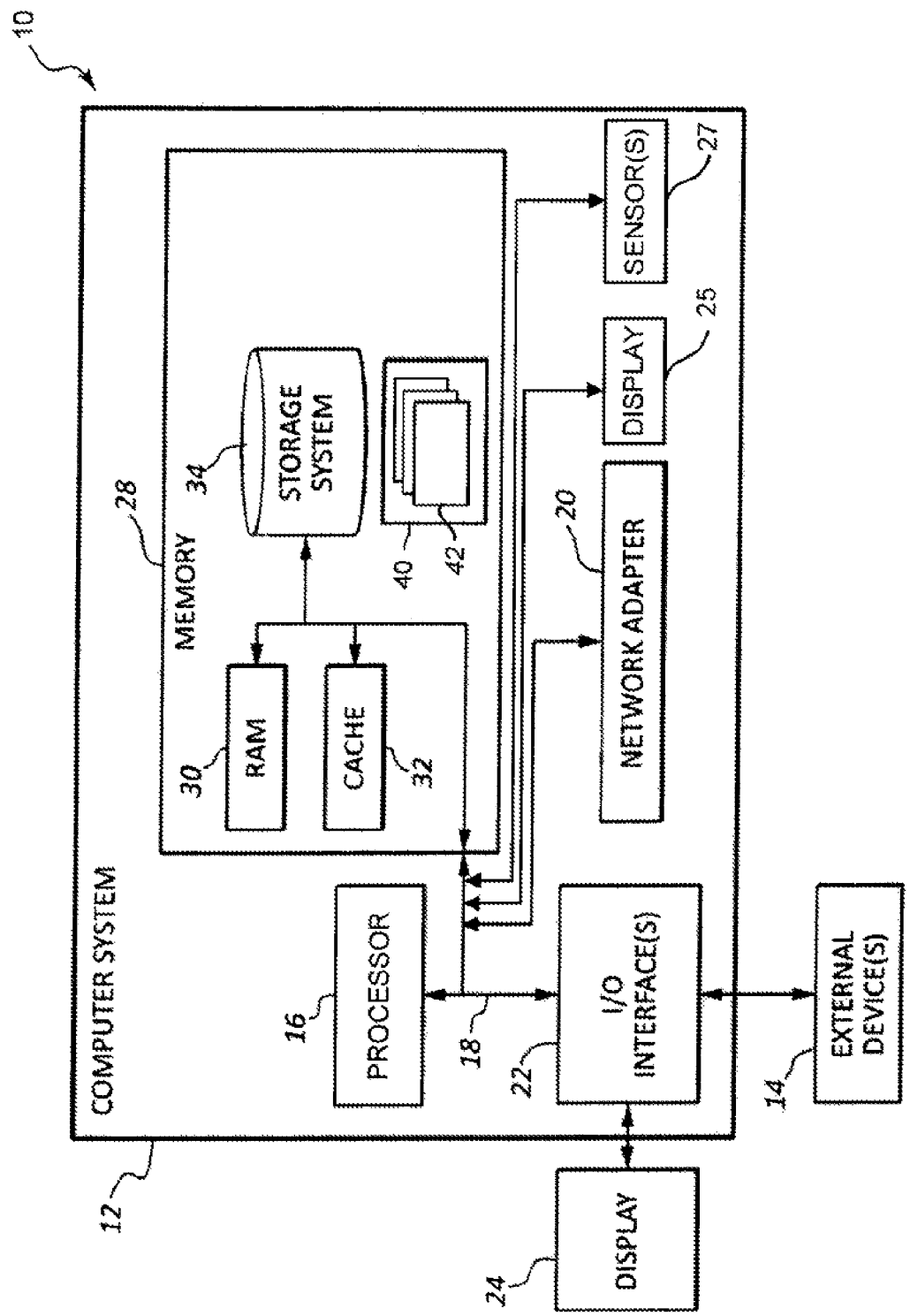
FIG. 4 depicts a computing node according to one embodiment.
Figure 5:
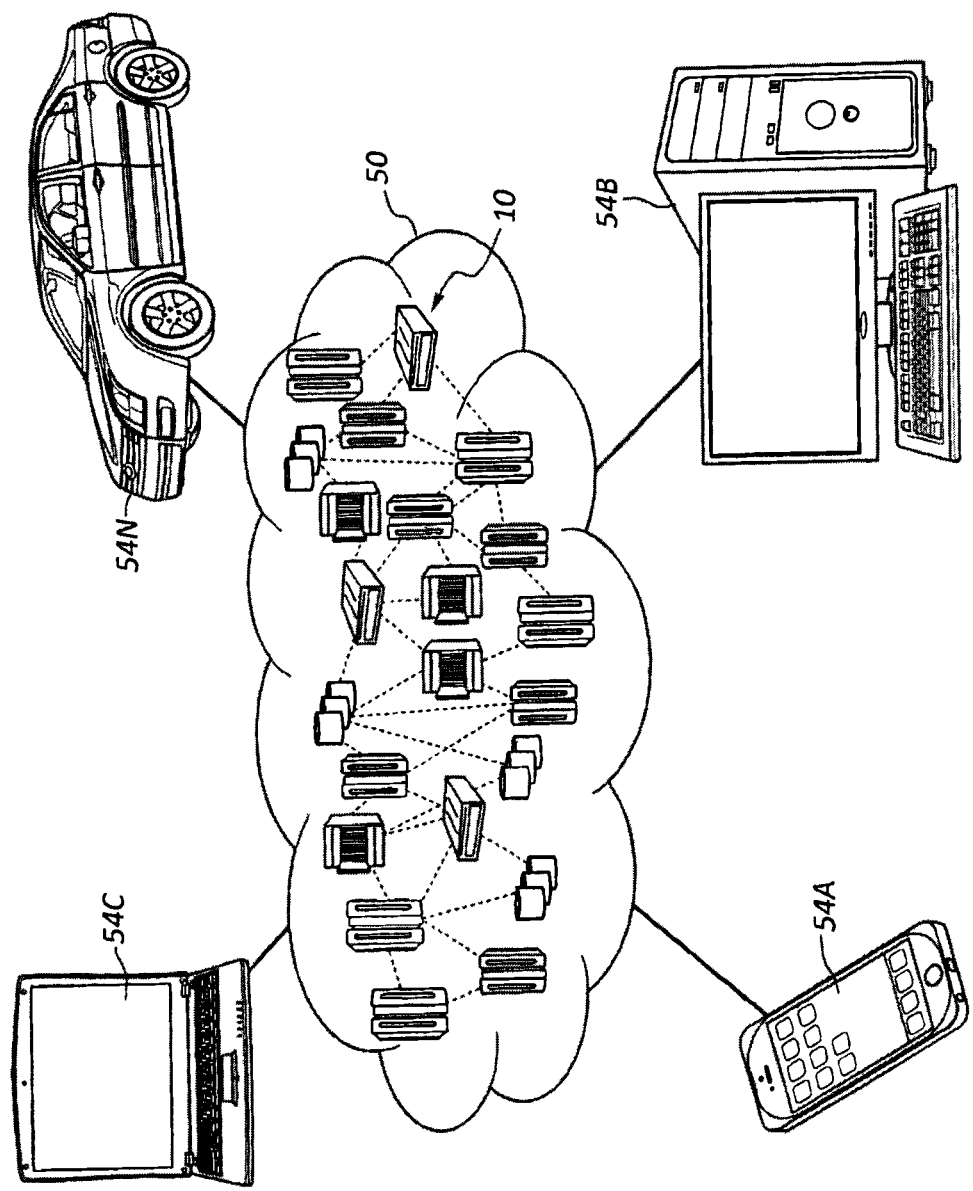
FIG. 5 depicts a cloud computing environment according to one embodiment.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node 10 is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other computing system environments or configurations. Examples of computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, an NVE as set forth herein can include one or more computing node 10 and can include one or more program 40 for performing functions described with reference to method 200 of the flowchart of FIG. 2. In one embodiment, an NVE as set forth herein can include one or more computing node 10 and can include one or more program 40 for performing functions attributed to an NVE described with reference to the method as set forth in reference to the flowchart of FIG. 3. In one embodiment, a VM as set forth herein can include one or more computing node 10 and can include one or more program 40 for performing functions attributed to a VM described with reference to the method as set forth in reference to the flowchart of FIG. 3. In one embodiment, an NVA as set forth herein can include one or more computing node 10 and can include one or more program 40 for performing functions attributed to an NVA described with reference to the method as set forth in reference to the flowchart of FIG. 3. Further, a VM as set forth herein can include one or more computing node 10 and can include one or more program 40 for performing functions attributed to a VM described with reference to the method as set forth in reference to the flowchart of FIG. 3. Further, an NVE as set forth herein can include one or more computing node 10 and can include one or more program 40 for performing functions attributed to an NVE described with reference to the method as set forth in reference to the flowchart of FIG. 3.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performance of providing of multicast traffic across virtual networks as described herein. The processing components 96 can be implemented as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   receiving, by a Network Virtualization Edge (NVE) of a first virtual network (VN), a multicast packet from a virtual machine (VM) of the first virtual network (VN);
   determining, by the NVE, whether the NVE currently supports forwarding the multicast packet to a second NVE of a second virtual network (VN), the second virtual network (VN) being logically separated from the first virtual network (VN); and
   responsively to determining that the NVE currently does not support forwarding the multicast packet to a second NVE of a second virtual network (VN) sending, by the NVE, a registration request to a network virtualization authority (NVA) for registering the NVE to support sending of multicast packets, wherein the registration request includes an identifier for the NVE and a multicast Group IP address of the multicast packet; and
   receiving, by the NVE, in response to the registration request a forwarding table supporting multicast packet communication between the first virtual network and the second virtual network.

2. The method of claim 1, wherein the NVA has a database that associates for a first Group IP address an NVE registered to send multicast packets having the first Group IP address and a plurality of receiving NVEs registered to receive multicast packets having the first Group IP address, wherein the plurality of receiving NVEs include a first receiving NVE of a first virtual network and a second receiving NVE of the second virtual network.

3. The method of claim 1, wherein the forwarding, by the NVE, the multicast packet to the second NVE includes using a forwarding table that associated the NVE and the second NVE to a multicast Group IP address for the multicast packet.

4. The method of claim 1, wherein the forwarding, by the NVE, the multicast packet to the second NVE includes using a forwarding table that associated the NVE and the second NVE to a multicast Group IP address for the multicast packet, and wherein the forwarding table is received from the NVA, the NVA having a database that associates a multicast Group IP address of the multicast packet to a sending NVEs registered to send multicast packets having the multicast Group IP address and to a plurality of receiving NVEs registered to receive multicast packets having the multicast Group IP address.

5. The method of claim 1, wherein the forwarding, by the NVE, the multicast packet to the second NVE includes using a forwarding table that associated the NVE and the second NVE to a multicast Group IP address for the multicast packet, and wherein the forwarding table is received from the NVA, the NVA having a database that associates a multicast Group IP address of the multicast packet to one or more sending NVE registered to send multicast packets having the multicast Group IP address and to a plurality of receiving NVEs registered to receive multicast packets having the multicast Group IP address.

6. The method of claim 1, wherein the NVE periodically receives updated forwarding tables for use in forwarding multicast packets from the NVE to one or more NVE of a virtual network (VN) logically separate from the first virtual network (VN), the updated forwarding tables being periodically generated and pushed from the NVA.

7. The method of claim 1, wherein a database of the NVA further associates to a second multicast Group IP address a second NVE registered to send multicast packets having the second multicast Group IP address and a plurality of second receiving NVEs registered to receive multicast packets having the second multicast Group IP address, wherein the plurality of second receiving NVEs include first and second receiving NVEs of virtual networks (VN) that are different and logically separated from each other, from the first virtual network (VN), and from the virtual networks (VNs) of the first and second receiving NVEs, and wherein the NVE periodically receives updated forwarding tables for use in forwarding multicast packets from the NVE to one or more NVE of a virtual network logically separate from the first virtual network, the updated forwarding tables being periodically generated and pushed from the NVA.

8. The method of claim 1, wherein the first virtual network (VN) is a Network Virtualization Over Layer 3 (NVO3) overlay virtual network, and the second virtual network (VN) is a Network Virtualization Over Layer 3 (NVO3) overlay virtual network.

9. A system comprising:
   a memory;
   at least one processor in communication with the memory; and
   program instructions executable by one or more processor via the memory to perform a method comprising:
      receiving, by a Network Virtualization Edge (NVE) of a first virtual network (VN), a multicast packet from a virtual machine (VM) of the first virtual network (VN);
      in response to the receiving determining, by the NVE, that the NVE currently does not support forwarding the multicast packet to a second NVE of a second virtual network (VN), the second virtual network (VN) being logically separated from the first virtual network (VN); and responsively to the determining that the NVE currently does not support forwarding the multicast packet to a second NVE of a second virtual network sending, by the NVE, a registration request to a network virtualization authority (NVA) for registering the NVE to support sending of multicast packets; and receiving, by the NVE, in response to the registration request a forwarding table supporting multicast packet communication between the first virtual network (VN) and the second virtual network (VN), wherein the multicast packet includes a multicast group destination Group IP address, wherein the determining that the NVE currently does not support forwarding the multicast packet to a second NVE of a second virtual network includes the NVE examining a forwarding table database of the NVE to determine that the forwarding table database is absent of any forwarding table specifying the Group IP address, wherein the registration request includes table forwarding data that specifies a virtual network identifier for the first virtual network (VN), the Group IP address, a tunnel IP address provided by an IP address of the NVE.

10. The system of claim 9, wherein the determining that the NVE currently does not support forwarding the multicast packet to a second NVE of a second virtual network includes the NVE examining data of a forwarding table database of the NVE.

11. The system of claim 9, wherein the forwarding table received from the NVA by the NVE supporting multicast packet communication between the first virtual network (VN) and the second virtual network (VN) has been generated by the NVA by the NVA performing a process wherein the NVA identifies a multicast receiver table stored on a forwarding table database that specifies the Group IP address, and wherein the forwarding table received from the NVA by the NVE supporting multicast packet communication between the first virtual network (VN) and the second virtual network (VN) includes the virtual network identifier for the first virtual network (VN), the Group IP address, the tunnel IP address provided by an IP address of the NVE, and multiple destination tunnel IP addresses.

12. The system of claim 9, wherein the forwarding table received from the NVA by the NVE supporting multicast packet communication between the first virtual network (VN) and the second virtual network (VN) has been generated by the NVA by the NVA performing a process wherein the NVA identifies a multicast receiver table stored on a forwarding table database that specifies the Group IP address.

13. The system of claim 9, wherein the forwarding table received from the NVA by the NVE supporting multicast packet communication between the first virtual network (VN) and the second virtual network (VN) has been generated by the NVA by the NVA performing a process wherein the NVA identifies a multicast receiver table stored on a forwarding table database that specifies the Group IP address, and wherein the forwarding table received from the NVA by the NVE supporting multicast packet communication between the first virtual network (VN) and the second virtual network (VN) includes the virtual network identifier for the first virtual network (VN), and the Group IP address.

14. The system of claim 9, wherein the forwarding table received from the NVA by the NVE supporting multicast packet communication between the first virtual network (VN) and the second virtual network (VN) has been generated by the NVA by the NVA performing a process wherein the NVA identifies a multicast receiver table stored on a forwarding table database that specifies the Group IP address, and wherein the forwarding table received from the NVA by the NVE supporting multicast packet communication between the first virtual network (VN) and the second virtual network (VN) includes the virtual network identifier for the first virtual network (VN), and multiple destination tunnel IP addresses provided by respective tunnel endpoint (TEP) IP addresses specifying respective IP addresses of multiple different destination NVEs.

15. The system of claim 9, wherein the NVE periodically receives updated forwarding tables for use in forwarding multicast packets from the NVE to one or more NVE of a virtual network (VN) logically separate from the first virtual network (VN), the updated forwarding tables being periodically generated and pushed from the NVA.

16. A computer program product comprising:
a computer readable storage medium readable by one or more processing unit and storing instructions for execution by one or more processor for performing a method comprising:
receiving, by a Network Virtualization Edge (NVE) of a first virtual network (VN), a multicast packet from a virtual machine (VM) of the first virtual network (VN);
determining, by the NVE, whether the NVE currently supports forwarding the multicast packet to a second NVE of a second virtual network (VN), the second virtual network (VN) being logically separated from the first virtual network (VN);
responsively to determining that the NVE currently does not support forwarding the multicast packet to a second NVE of a second virtual network (VN) sending, by the NVE, a registration request to a network virtualization authority (NVA) for registering the NVE to support sending of multicast packets, wherein the registration request includes an identifier for the NVE and a multicast Group IP address of the multicast packet; and receiving, by the NVE, in response to the registration request a forwarding table supporting multicast packet communication between the first virtual network (VN) and the second virtual network (VN), wherein the NVA has a database that associates to a first multicast Group IP address a sending NVE registered to send multicast packets having the first multicast Group IP address and a plurality of NVEs registered to receive multicast packets having the first multicast Group IP address, and wherein the plurality of NVEs include first and second collections of NVEs respectively associated to first and second further virtual networks (VNs) that are different and logically separated from each other and from the first virtual network (VN).

17. The computer program product of claim 16, wherein the forwarding, by the NVE, the multicast packet to the second NVE includes using a forwarding table that associates the NVE and the second NVE to a multicast Group IP address for the multicast packet, and wherein the forwarding table is received from the NVA, the NVA having a database that associates a multicast Group IP address of the multicast packet to a sending NVEs registered to send multicast packets having the multicast Group IP address and to a plurality of receiving NVEs registered to receive multicast packets having the multicast Group IP address.

18. The computer program product of claim 16, wherein the forwarding, by the NVE, the multicast packet to the second NVE includes using a forwarding table that associates the NVE and the second NVE to a multicast Group IP address for the multicast packet, and wherein the forwarding table is received from the NVA, the NVA having a database that associates a multicast Group IP address of the multicast packet to sending NVE registered to send multicast packets having the multicast Group IP address and to a plurality of receiving NVEs registered to receive multicast packets having the multicast Group IP address.

19. The computer program product of claim 16, wherein the database of the NVA further associates to a second multicast Group IP address a second NVE registered to send multicast packets having the second multicast Group IP address and a plurality of second receiving NVEs registered to receive multicast packets having the second multicast Group IP address, wherein the plurality of second receiving NVEs include first and second receiving NVEs of virtual networks (VN) that are different and logically separated from each other, from the first virtual network (VN), and from the virtual networks (VNs) of the first and second receiving NVEs, and wherein the NVE periodically receives updated forwarding tables for use in forwarding multicast packets from the NVE to one or more NVE of a virtual network logically separate from the first virtual network, the updated forwarding tables being periodically generated and pushed from the NVA.

20. The computer program product of claim 16, wherein the NVE periodically receives updated forwarding tables for use in forwarding multicast packets from the NVE to one or more NVE of a virtual network (VN) logically separate from the first virtual network (VN), the updated forwarding tables being periodically generated and pushed from the NVA.

* * * * *